Figure 2:
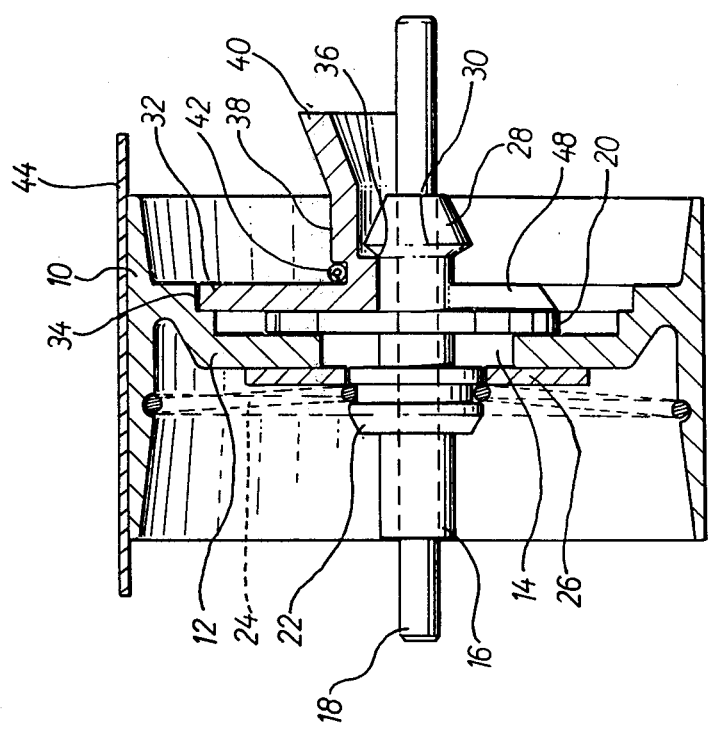

United States Patent [19]

Fryatt

[11] 4,169,530
[45] Oct. 2, 1979

[54] PULLEY ASSEMBLIES

[75] Inventor: Leslie A. Fryatt, Accrington, England

[73] Assignee: J. H. Fenner & Co. Limited, North Humberside, England

[21] Appl. No.: 900,370

[22] Filed: Apr. 26, 1978

[30] Foreign Application Priority Data

Apr. 29, 1977 [GB] United Kingdom ............... 17927/77

[51] Int. Cl.² .............................................. B65G 23/04
[52] U.S. Cl. ..................................... 198/835; 74/211; 199/857
[58] Field of Search ............... 198/857, 855, 835, 781, 198/789, 790; 74/211, 203, 405

[56] References Cited

U.S. PATENT DOCUMENTS 1,307,695  6/1919  Parker ................................. 198/857
3,399,582  9/1968  Henry ................................. 74/211 X

FOREIGN PATENT DOCUMENTS 519303  5/1953  Belgium ................................. 198/835

Primary Examiner—Robert B. Reeves
Assistant Examiner—Douglas D. Watts
Attorney, Agent, or Firm—Fred Philpitt

[57] ABSTRACT

For use primarily in a conveyor system wherein articles are required to be propelled along a predetermined path by driven belt means, the invention provides a pulley assembly having a rim member movable into and out of contact with the belt means responsive to a cam which is actuated by the propelled articles. The pulley assembly may itself directly drive the belt means or it may contact and thus drive the propelled articles or it may contact rollers in said predetermined path and upon which said articles rest.

12 Claims, 4 Drawing Figures

U.S. Patent  Oct. 2, 1979  Sheet 2 of 2  4,169,530

PULLEY ASSEMBLIES

This invention concerns pulley assemblies and relates more especially to pulley assemblies for use with powered conveyors of the type wherein articles to be conveyed rest on rolling elements such as wheels or rollers and drive to those articles is supplied by a driving belt which either is applied directly to the said articles or alternatively is applied to some or to all of the rolling elements on which the articles may rest.

Situations often arise in the operation of conveyors which require numbers of articles, such as boxes or parcels, to be allowed to remain stationary and to accumulate at some point along the conveyor path. When this happens, the drive to the belt must be kept going and must initially be continued to be applied from the belt to the conveyed articles in order that subsequent articles may be fed to the rear of the queue. However, continued application of the drive to the queued articles produces pressure on the articles which accumulates along the length of the queue and can both damage the articles and overload the drive.

It has already been proposed to avoid dangerous pressure accumulation by arranging that the first article to reach a point where further progress is to be prevented can be arrested either by imposing a barrier against which the action of the conveyor continually urges the article or where the drive can be disconnected from the region of the conveyor occupied by the article for the latter purpose, the presence of the article in that conveyor region operates a sensor means effective to disconnect drive from the immediately upstream area of the conveyor and successive sensor means are arranged in successive upstream areas of the conveyor and are operable responsive to the arrival of succeeding articles in those areas to cause or initiate the removal of the drive applied to those succeeding articles. Such sensor means may employ the energy available in the driving belt to achieve the removal of drive from the conveyed articles or they may control the operation of separate energy sources but the former is usually preferred.

When circumstances arise, as a result of which the leading article is released, it is usual to restore drive to the next succeeding article and then to continue that restoration successively along the queue as the articles move along the conveyor.

In one widely used arrangement, drive is supplied to the conveyed articles or to the rolling elements, as the case may be, by applying the driving belt to the same, usually by engaging the top run of the belt against them and conversely, drive is removed by disengaging the belt. In sections of the conveyor path where such belt engagement and disengagement is required, this is often accomplished by supporting the upper run of the belt on a roller carried on a spindle mounted at each end on a bell crank lever or other eccentric member which is actuated responsive to the aforementioned sensor means, thereby to lift the upper arm of the belt towards or to lower it from the conveyor path and thus to cause the belt to drive or not to drive the conveyed articles, according to prevailing conditions. Whilst such an arrangement is quite satisfactory for many applications, however, it will be appreciated that it does require the availability of not inconsiderable amounts of energy for its operation and that such energy ultimately represents a demand on the driving power available from the driving belt. For example, the sensor means is often a mechanically displaceable member constituting the input to a mechanical linkage by which the mounting spindle of the belt supporting roller is lifted or lowered, displacement of the said member taking place as a conveyed article comes into contact or releases contact with it. However, the operation of such a mechanical linkage not only draws significant energy from the driving belt but is dependent upon the force applied to the sensor means and therefore essentially upon the weight of the conveyed article. Thus, it cannot be adjusted to respond to relatively light articles, for example, to empty boxes and yet control full boxes, and for similar reasons, it may not be entirely consistent and reliable in operation and it may impede the passage of articles. This is particularly the case where, as is usual, the belt supporting roller is biased towards a lifted position and the mechanical linkage is required, where drive is to be removed from the conveyed articles, to overcome that bias and maintain said roller in a lowered position.

Other arrangements previously used make use of a cam-shaped roller to support the driving belt. The rotation of the cam-shaped rollers can be arrested with the cams in a position so that the belt dragging over the stationary cams passes clear of the articles or their support rollers. This action wastes energy from the main drive.

The invention seeks to avoid the problems described immediately above by providing a belt supporting roller assembly which is less dependent for its operation upon the weight of the conveyed articles and which avoids waste of energy from the driving belt.

The present invention accordingly provides a pulley assembly comprising a cylindrical rim which, intermediate its axial ends, has a radially inwardly directed and axially apertured flange, a hub member having an intermediate portion passing with substantial radial clearance through the axial aperture of the flange, means adjoining said intermediate portion for constraining axial movement of the flange with respect to the hub member, and retractable spoke means displaceable between a normal position wherein the pulley rim is supported by said means in coaxial relation to the hub member and a retracted position wherein that support is removed and said rim undergoes a radial displacement causing its flange to engage directly on the hub member.

By virtue of the radial displacement available to the pulley rim, a belt supported on it is enabled to be moved between driving and non-driving positions.

Preferably the spoke means are capable of being angularly displaced or tilted relative to the hub member and they may for this purpose take the form of arcuate segments which are circularly distributed around the hub member and which, in addition to spoke portions engageable between the pulley rim and the hub member, have axially directed cam follower elements accessible to a cam or the like by which the desired tilting motion is effected consequent upon pulley rotation.

The aforementioned constraining means may include a radial flange adjoining the intermediate portion of the hub member and rotationally fixed on or integral with the latter and the arcuate spoke segments may be arranged between said flange and an axially spaced fulcrum similarly carried by the hub member.

Conveniently, a centering spring is interposed between the hub member and the pulley rim, both to restore the latter into its coaxial relation with the hub member when the arcuate spoke segments are released into their normal, rim-supporting condition, and also to drivingly connect the rim and the hub member for maintaining the spoke segments in rotation with the remainder of the pulley assembly. In this latter connection, the hub member flange may be keyed to ensure positive transmission of the rotary motion to the spoke segments.

Figure 1:
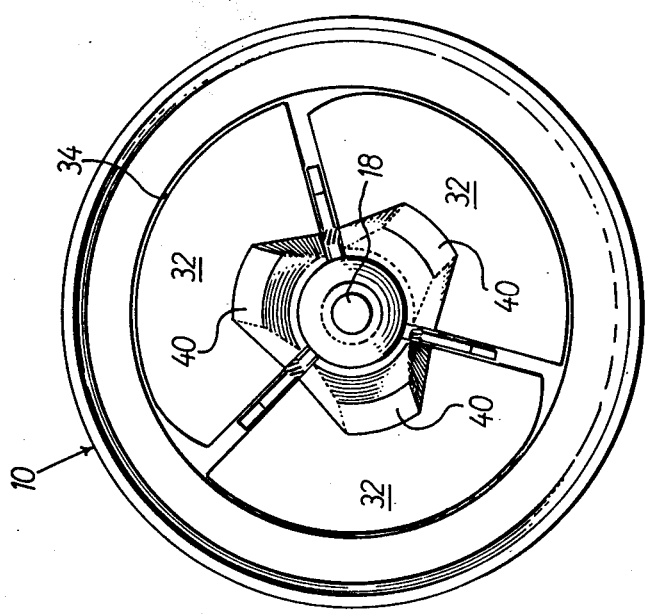
Figure 4:
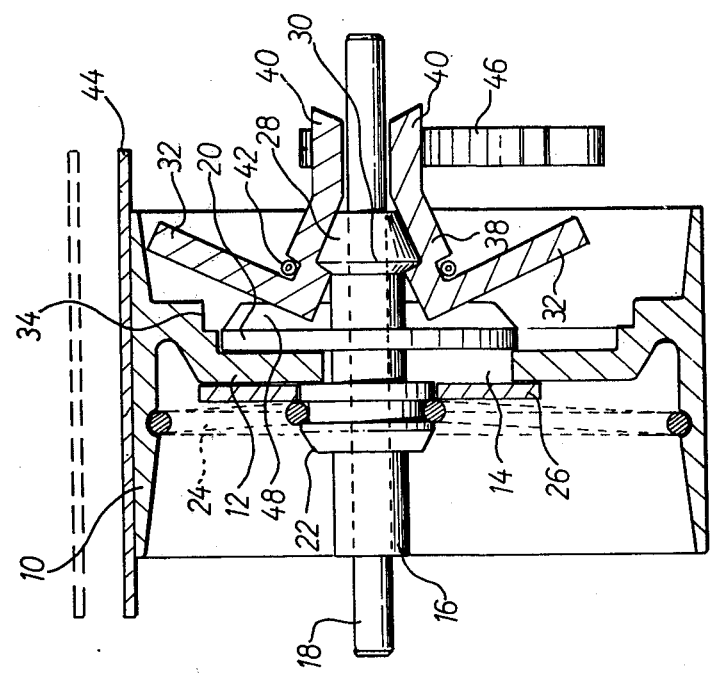
Figure 3:
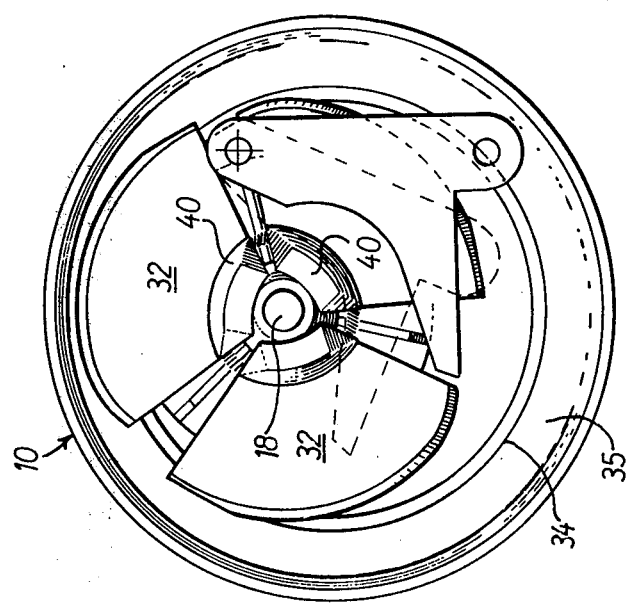

The invention will be described further, by way of example, with reference to the accompanying drawings, in which:

FIG. 1 is an axial end view of a pulley assembly embodying the invention with parts omitted for clarity, to show the pulley rim supported coaxially on the hub member, FIG. 2 is an axial section thereof, FIG. 3 is an axial end view similar to that of FIG. 1, showing the pulley rim in its radially spaced condition, and FIG. 4 is an axial section of the assembly shown in FIG. 3.

In the drawings, a pulley rim 10 has, intermediate its axial ends, a radial flange 12 formed with an axial aperture 14. A hollow hub member 16, which when in use is mountable on a spindle 18, passes with substantial radial clearance through the aperture 14 and is formed with an integral flange 20 preventing axial movement of the pulley rim 10 in one direction relative to the hub member. Similar movement of the rim 10 in the opposite axial direction is prevented by an annular shoulder 22 on the hub member and by a flat spiral spring 24 connected between the shoulder 22 and the inner peripheral surface of the rim 10, the spring 24 serving to locate a washer 26 against the flange 12 and also acting to centre the rim coaxially relative to the hub member.

Axially outwardly of its integral flange 20, the hub member 16 is also integrally formed with a flucrum member 28 comprising a pair of frusto-conical portions in back-to-back relation and defining a pivotal edge 30. Between the fulcrum member 28 and the flange 20, three circularly spaced, arcuate spoke members 32 are seated on the hub member with their outer peripheral edges engaged in an annular rebate 34 of the flange 12. The radially inner periphery of each arcuate segment 32 is axially thickened to present an axially outer edge 36 pivotally engaging the junction between the hub member 16 and fulcrum member 28 and from this axially thickened periphery extends an axially directed arm 38 terminating in a cam follower end 40. A garter spring 42 embracing the inner peripheral ends of the spoke members 32 maintains them seated on the hub member 16 and supporting the rim 10.

In operation, for example when the pulley assembly is used to support a moving belt 44 the belt rotates the pulley rim 10, which is supported coaxially on the hub member 16 through the spoke members 32, and the rim 10, through the spring 24, rotates the hub member 16 on the spindle 18. When it is desired to disengage the belt 44, for example from rollers of a conveyor or from roller-supported articles on a roller conveyor, an arcuate cam 46 (FIG. 4) is displaced to intercept the rotational path of the cam followers 40 of the arcuate spokes 32, the latter thus being tilted out of their normal positions into the retracted positions shown in FIG. 4, where they are disengaged from the rebate 34. The driving tension and the weight of the belt 44 then urge the pulley rim 10 radially downwards until the flange 12 seats on the hub member 16 and the pulley continues rotating on that seat but with the belt 44 at a lower position than its normal position, again as shown in FIG. 4. Keys 48 are provided on the hub member flange 20 to ensure that rotary motion is at all times transmitted to the arcuate segmental spokes.

As will be noted from the drawings, the cam 46 is positioned to actuate each segmental spoke 32 as the spoke traverses its lowermost position and, therefore, when it is most lightly loaded. As a result, the effort needed to place the cam 46 in its illustrated operative position and to maintain it in that position against the reaction of the actuated cam follower 40 is also very low and can be applied, in a conveyor assembly for example, by a mechanical linkage (not shown) of which the input member may accordingly sense the passage not only of relatively heavy articles but also of quite light articles. On release of the cam 46 from the position wherein it intercepts the cam followers 40, the garter spring 42 urges the spokes 32 back towards their normal positions and, as rotation of the rim 10, driven by the belt, continues, the spokes 32 successively re-seat themselves in the annular rebate 34 of the rim. Positive re-seating results from the freedom of the leading spoke 32 (at the instant the cam 46 is released) to enter the segmental area 35 of the rebate 34 which is defined at the lowest part of the latter when the hub member 16 and spokes 32 are eccentric to the rim 10. Once the leading spoke has re-engaged in the recess, then during subsequent rotation of the assembly it acts as a rotating wedge between the hub member 16 and the pulley rim 10, lifting the rim 10 to the concentric position, which is thereafter stabilised as the next following spokes 32 enter the rebate 34. A radius (not shown) may conveniently be formed on the leading edge of each spoke 32 to assist this action.

I claim:

1. A pulley assembly comprising a cylindrical rim member, a radially inwardly directed and axially apertured flange intermediate the axial ends of said cylindrical rim member, a hub member having an intermediate portion passing with substantial radial clearance through the axial aperture of the flange, means adjoining said intermediate portion for constraining axial movement of the flange with respect to the hub member, and retractable spoke means displaceable between a normal position wherein said rim member is supported by said spoke means in coaxial relation to the hub member and a retracted position wherein that support is removed and said rim member undergoes a radial displacement causing its flange to engage directly on the hub member.

2. A pulley assembly according to claim 1, wherein the spoke means are capable of being tilted relative to the hub member.

3. A pulley assembly according to claim 2, wherein the spoke means are arcuate segments which are circularly distributed around the hub member and which comprise spoke portions engageable between the pulley rim and the hub member and axially directed cam follower elements accessible to a cam or the like by which the desired tilting motion is effected consequent upon pulley rotation.

4. A pulley assembly according to claim 3, wherein the constraining means includes a radial flange adjoining the intermediate portion of the hub member and rotationally fixed with respect to the latter and an axially spaced fulcrum carried by the hub member, the arcuate spoke segments being arranged between said flange and said fulcrum.

5. A pulley assembly according to claim 4, wherein a greater spring embracing the inner peripheral ends of the spoke portions maintaining the arcuate segments seated between said flange and said fulcrum.

6. A pulley assembly according to claim 5, wherein a centering spring is interposed between the hub member and the pulley rim, both to restore the latter into its coaxial relation with the hub member when the arcuate spoke segments are released into their normal, rim-supporting condition, and also to drivingly connect the rim and the hub member for maintaining the spoke segments in rotation with the remainder of the pulley assembly.

7. A pulley assembly according to claim 5, wherein the hub member flange is keyed to ensure positive transmission of the rotary motion to the spoke segments.

8. A conveyor system comprising a moving surface for propelling articles in a required direction along a predetermined path, wherein said surface comprises at least one pulley assembly as claimed in any one of claims 1 to 7.

9. A conveyor system according to claim 8, wherein said moving surface includes an endless belt adapted to contact articles to be propelled along said path, said belt being driven by said pulley assembly.

10. A conveyor system according to claim 9, wherein the conveyed articles are carried by said belt.

11. A conveyor system according to claim 8, wherein said moving surface comprises a plurality of article-supporting rollers distributed along said predetermined path and a driven endless belt, and in which contact of the belt with the conveyed articles serves to propel said articles along said rollers, said contact being effected by said pulley assembly.

12. A conveyor system according to claim 8, wherein said moving surface comprises a plurality of article-supporting rollers distributed along said predetermined path and including said pulley assembly for contacting the supported surfaces of said articles to propel the same along said path.

* * * * *